(12) United States Patent
Decrop et al.

(10) Patent No.: US 11,356,794 B1
(45) Date of Patent: Jun. 7, 2022

(54) AUDIO INPUT SOURCE IDENTIFICATION

(71) Applicant: International Business Machines Corporation, Armonk, NY (US)

(72) Inventors: Clement Decrop, Arlington, VA (US); Spencer Thomas Reynolds, Austin, TX (US); Jeremy R. Fox, Georgetown, TX (US); Zachary A. Silverstein, Austin, TX (US); Jacob Ryan Jepperson, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/201,295

(22) Filed: Mar. 15, 2021

(51) Int. Cl.
*H04S 7/00* (2006.01)

(52) U.S. Cl.
CPC .................................. *H04S 7/303* (2013.01)

(58) Field of Classification Search
None
See application file for complete search history.

(56) References Cited

U.S. PATENT DOCUMENTS

| | | |
|---|---|---|
| 8,041,054 B2 | 10/2011 | Yeldener et al. |
| 9,113,239 B2 | 8/2015 | Kim |
| 9,253,564 B2 | 2/2016 | Prentice |
| 9,329,833 B2 | 5/2016 | Swierk et al. |
| 9,432,787 B2* | 8/2016 | Krishnaswamy ........ H04R 3/00 |
| 9,620,105 B2 | 4/2017 | Mason |
| 9,723,401 B2 | 8/2017 | Chen et al. |
| 9,986,331 B2 | 5/2018 | Li |
| 10,051,396 B2 | 8/2018 | Virolainen et al. |
| 2009/0196429 A1* | 8/2009 | Ramakrishnan ..... H04R 29/004 381/26 |
| 2015/0304786 A1* | 10/2015 | Partio .................. H04R 25/305 381/58 |
| 2017/0150285 A1* | 5/2017 | Krantz ................ H04R 29/001 |

FOREIGN PATENT DOCUMENTS

WO    2008011902 A1    1/2008

OTHER PUBLICATIONS

Unknown, "Video Conferencing Market Size Worth $8.56 Billion By 2027", Grand View Research, Apr. 2020, 7 pages.
Edwards, B., "Howto Choose Your Microphone on a Mac", Jul. 23, 2020, 4 pages.
Mell et al., "The NIST Definition of Cloud Computing", Recommendations of the National Institute of Standards and Technology, Sep. 2011, 7 pages.

* cited by examiner

*Primary Examiner* — James K Mooney
(74) *Attorney, Agent, or Firm* — James L. Olsen (57) ABSTRACT

Upon an attempt to communicate through an audio input source in a voice session, a determination can be made whether an audio quality received from a user through the audio input source is below an audio quality threshold. In response to determining that the audio quality through the audio input source is below the audio quality threshold, a first voice input can be received from the user from a first position. A second voice input can be received from the user from a second position. A first volume of the first voice input from the first position can be compared to a second volume of the second voice input from the second position. Feedback can be provided to the user indicating whether the user is closer or farther from the audio input source based on the comparison.

20 Claims, 6 Drawing Sheets

AUDIO INPUT SOURCE IDENTIFICATION

BACKGROUND

The present disclosure relates generally to the field of computing, and in particular, to audio input source identification.

SUMMARY

Embodiments of the present disclosure include a method, computer program product, and system for audio input source identification. Upon an attempt to communicate through an audio input source in a voice session, a determination can be made whether an audio quality received from a user through the audio input source is below an audio quality threshold. In response to determining that the audio quality through the audio input source is below the audio quality threshold, a first voice input can be received from the user from a first position. A second voice input can be received from the user from a second position. A first volume of the first voice input from the first position can be compared to a second volume of the second voice input from the second position. Feedback can be provided to the user indicating whether the user is closer or farther from the audio input source based on the comparison.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to audio input source identification. While the present disclosure is not necessarily limited to such applications, various aspects of the disclosure can be appreciated through a discussion of various examples using this context.

As individuals are more frequently relying on online communication methods such as web-based meetings, audio/video (A/V) issues associated therewith are also increasing. A commonly encountered A/V issue may arise when an individual has multiple audio input sources (e.g., microphones) that may be used to facilitate online communication. The user may be connected to an audio input source inadvertently, and this may result in a drastic decrease in audio quality transmitted from the user. For example, the unintended audio source may be hidden from the user, oriented a wrong direction from the user, too far away from the user, unknown to the user, etc. Methods for identifying and managing audio input sources to improve audio quality are needed.

Aspects of the present disclosure relate to audio input source identification. Upon an attempt to communicate through an audio input source in a voice session, a determination can be made whether an audio quality received from a user through the audio input source is below an audio quality threshold. In response to determining that the audio quality through the audio input source is below the audio quality threshold, a first voice input can be received from the user from a first position. A second voice input can be received from the user from a second position. A first volume of the first voice input from the first position can be compared to a second volume of the second voice input from the second position. Feedback can be provided to the user indicating whether the user is closer or farther from the audio input source based on the comparison.

Figure 1:
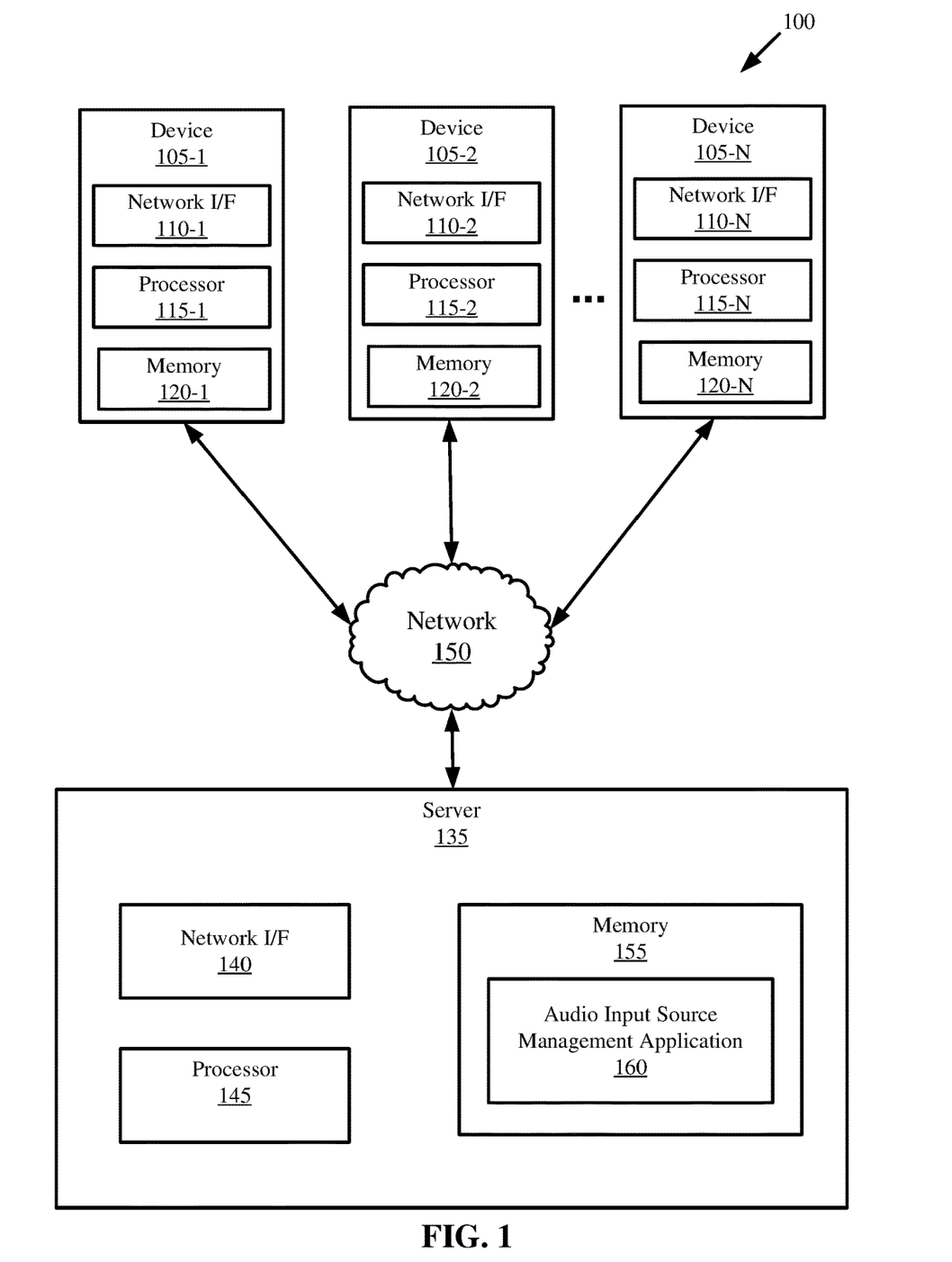
FIG. 1 is a block diagram illustrating an example computing environment in which illustrative embodiments of the present disclosure can be implemented.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.).

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 4.

The server 135 includes an audio input source management application 160. The audio input source management application 160 can be configured to aid a user in identifying one or more audio input sources (e.g., microphones) they are currently utilizing. Further, the audio input source management application 160 can be configured to organize audio input sources used by the user.

The audio input source management application 160 can be configured to determine, upon establishment of a voice session (e.g., a user begins attempting to communicate through an audio input source), whether an audio input source the user is communicating through is a new audio input source. In embodiments, this can be completed as if the audio input source is not new, the user may be familiar with the audio input source, and thus identification of the audio input source may not be necessary. However, in some embodiments, even if the audio input source is known, identification of the audio input source may still be required (e.g., if the user has two or more audio input sources connected to the same device, and cannot ascertain which audio input source is currently being used). In some embodiments, determining whether the audio input source is new can be completed by determining whether the audio input source was used in one or more previous voice sessions.

A determination can then be made whether the audio quality through the new audio input source is below an audio quality threshold (e.g., the audio quality is poor). In embodiments, determining whether audio transmitted through the audio input source is below a quality threshold can be completed based on a signal analysis (e.g., the frequency and amplitude of the audio signals can be analyzed, such as signal-to-noise ratio (SNR)) and/or a natural language processing (NLP) based analysis (e.g., a determination can be made whether words uttered by the user can be recognized). If the audio input source is new and/or the audio quality is below the audio quality threshold, then a request for an identification session can be initiated by the audio input source management application 160.

An identification session refers to an iterative process in which a user is prompted to provide voice inputs at a substantially similar volume from varying locations until the user locates the audio input source currently being utilized. Upon receiving each voice input, the audio input source management application 160 can be configured to provide feedback to the user (e.g., audio feedback, haptic feedback, visual feedback, etc.) indicating whether they are closer or farther from the device based on the volume of the voice input as compared to the last submitted voice input. If the voice input is louder than the previously submitted voice input (e.g., the amplitude of the audio signals is greater), then feedback provided by the audio input source management application 160 can indicate that the user is closer to the new audio input source. If the voice input is quieter than the previously submitted voice input (e.g., the amplitude of the audio signals is lesser), then feedback provided by the audio input source management application 160 can indicate that the user is farther from the new audio input source. In embodiments, an assumption is made that the voice inputs uttered by the user are a substantially similar volume.

Voice input requests and feedback transmittals can be iteratively executed until an indication is received that the user located the device. In some embodiments, the indication can be determined based on audio data received from the user. For example, the indication that the user located the device can be determined based on a recognized phrase (e.g., "I found the device" is recognized). However, any other suitable data (e.g., visual data) can be used to determine whether the user located the audio input source.

Upon locating the audio input source, the audio input source management application 160 can be configured to prompt the user to specify an identity of the audio input source (e.g., headset, laptop, controller, etc.). Thereafter, upon a future voice session, the newly identified audio input source can be selected from a list of identified audio input sources.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. For example, in embodiments, functionalities of the audio input source management application 160 can be performed by one or more devices 105.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
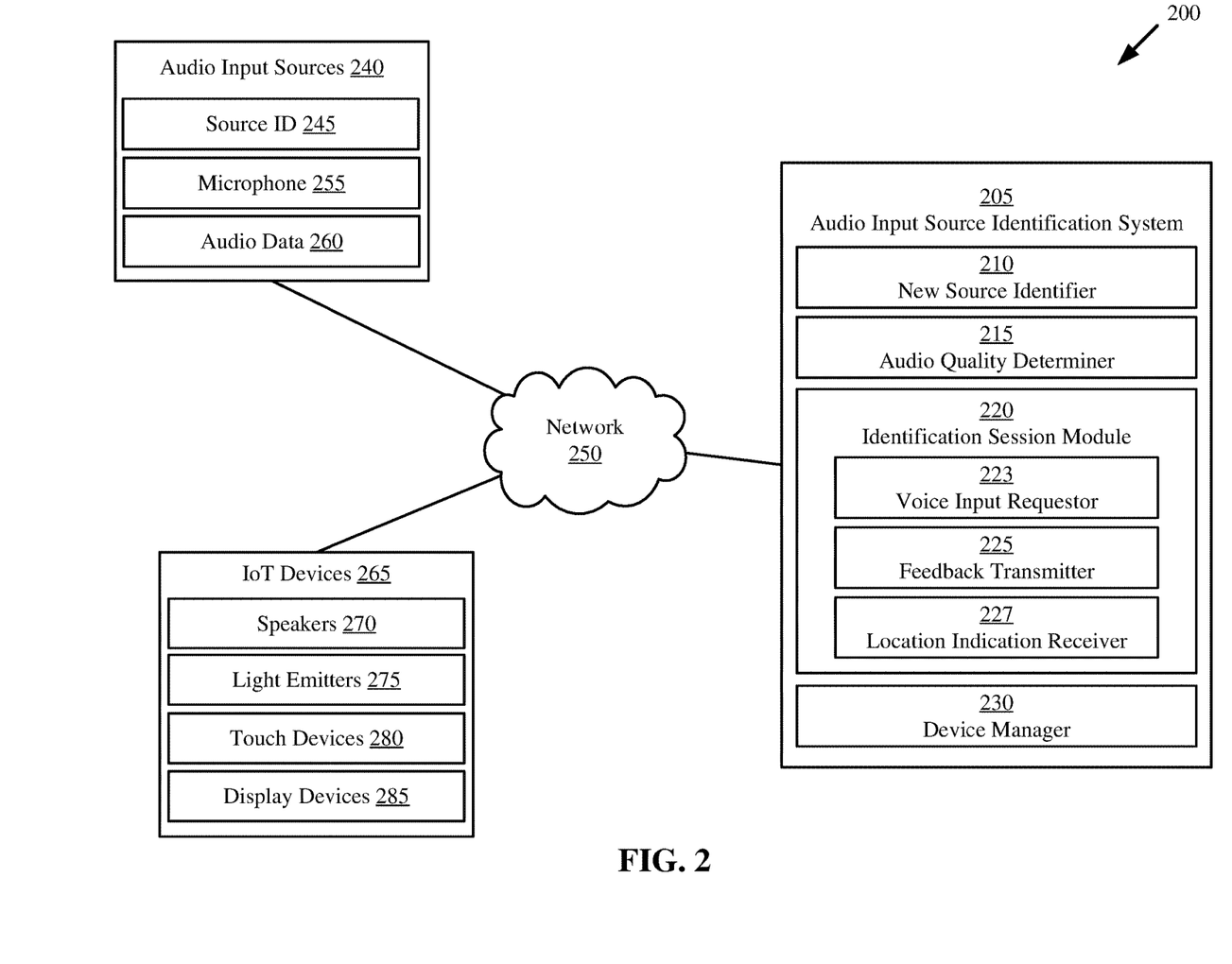
FIG. 2 is a diagram illustrating an example internet of things (IoT) environment in which illustrative embodiments of the present disclosure can be implemented.

Referring now to FIG. 2, illustrated is a block diagram of an example Internet of Things (IoT) environment 200 according to aspects of the present disclosure. The IoT environment 200 can include numerous components communicatively coupled by a network 250, such as, but not limited to, an audio input source identification system 205, audio input sources 240, and IoT devices 265. The various components within the IoT environment 200 can be processor executable instructions that can be executed by a dedicated or shared processor using received inputs. Further, one or more functionalities performed by the audio input source identification system 205 can be performed by other components within the IoT environment 200 (e.g., audio input sources 240 and IoT devices 265).

The audio input source identification system 205 can be configured to aid users in identifying audio input sources 240 they are currently communicating through. Users may have multiple audio input sources 240 communicatively coupled to a device (e.g., device 105-1 of FIG. 1) they are establishing voice sessions through. Thus, users can lose track of the audio input source they are currently communicating through. For example, a microphone 255 of an audio input source 240 the user intends to use may not be active, but rather a microphone 255 of another audio input source 240 in the nearby vicinity may be active. This can lead to a drastic decline in audio quality, as the user may not be speaking into the correct microphone 255. The audio input source identification system 205 aids the user in identifying the audio input source 240 they are currently utilizing.

A new source identifier 210 of the audio input source identification system 205 can be configured to determine, upon establishment of a voice session by a user, whether an audio input source the user is communicating through is new. In embodiments, this can be completed as if the audio input source is not new, the user may be familiar with the audio input source, and identification of the audio input source may not be necessary. However, in some embodiments, even if the audio input source is known, identification of the audio input source may still be required (e.g., if the user has two or more audio input sources connected to the same device, and cannot ascertain which audio input source is currently being used). Thus, in some embodiments, if new source identifier 210 determines that the audio input source is new, then identification of the audio input source by the audio input source identification system 205 (e.g., by the identification session module 220) can be completed.

In some embodiments, determining whether the audio input source is new can be completed by determining whether the audio input source was used in one or more previous voice sessions. In some embodiments, determining whether an audio input source is new can be completed by referencing source identifications (IDs) 245 of audio input sources 240. In these embodiments, if the currently utilized audio input source is not associated with a known source ID 245, then a determination can be made that the audio source is new.

An audio quality determiner 215 of the audio input source identification system 205 can be configured to determine an audio quality of the audio transmitted through the audio input source. Determining the audio quality can be completed to determine whether an identification session should be initiated. For example, if the audio quality is below a quality threshold (e.g., the audio quality is poor), then an identification session may be required as the audio input source may be hidden, oriented a wrong direction, and/or low quality. In contrast, if the audio quality is above a quality threshold (e.g., the audio quality is good), then an identification session may not be required as the audio input source is currently fulfilling its intended purpose. Thus, audio data 260 associated with an audio input source 240 can be analyzed to ascertain audio quality of the audio data 260.

Audio quality can be determined in any suitable manner. In some embodiments, analysis of audio signals can be completed. In these embodiments, characteristics of the audio signals such as amplitude and frequency can be analyzed to determine audio quality. For example, in response to amplitude of audio signals exceeding or falling below a threshold, a determination can be made whether the audio quality falls below a quality threshold (e.g., amplitude spikes can indicate low audio quality, as well as low amplitude over time). As another example, audio signal frequency can be used to determine whether audio quality is below a quality threshold. For example, if frequency of the audio signals exceeds or falls below a frequency threshold, a determination can be made that audio quality is below a quality threshold (e.g., high/low frequency can indicate feedback and/or background noise). However, any suitable audio signal based analysis can be completed to determine whether audio quality is above an audio quality threshold. For example, in some embodiments, a signal-to-noise ratio (SNR) of the audio transmitted through the audio input source 240 can be determined. In these embodiments, if the SNR exceeds a threshold SNR (e.g., 1:2, 1:1, 2:1, etc.), then a determination can be made that the audio quality is below the quality threshold. In some embodiments, Fourier Transform (FT) can be used to analyze audio signals by converting the audio signals into a frequency domain.

In some embodiments, audio quality can be determined based on a natural language processing (NLP) based analysis. In these embodiments, the ability to recognize speech can indicate the audio quality, where a low ability to recognize speech can indicate low audio quality. For example, a determination can be made that audio quality is above a quality threshold if a threshold number of words can be recognized over a given time interval. As another example, a determination can be made that audio quality is below a quality threshold if a threshold number of words cannot be recognized over a given time interval. However, audio quality can be determined based on any other suitable NLP-based analysis.

If a determination is made that the audio input source is new and/or a determination is made that audio quality is below an audio quality threshold, an identification session module 220 can be configured to initiate an identification session to identify (e.g., aid the user in locating) the audio input source. The identification session module 220 can be configured to iteratively prompt the user to provide voice inputs through a voice input requestor 223. In embodiments, the voice input requestor 223 can specify that the user's voice inputs should be at a substantially similar volume but from a new position (e.g., location) with respect to the audio input source as compared to a previously submitted voice input.

Upon receiving an initial voice input from a user, the voice input requestor 223 can be configured to request another voice input from a second location (at a substantially similar volume). The identification session module 220 then compares the volume (e.g., amplitude) of the second received voice input to the first received voice input. If the second received voice input is greater in volume than the first received voice input, a feedback transmitter 225 of the identification session module 220 can be configured to transmit feedback indicating that the user is closer to the device. If the second received voice input is lesser in volume than the first received voice input, the feedback transmitter 225 of the identification session module 220 can be configured to transmit feedback indicating that the user is farther from the device.

The feedback transmitter 225 can be configured to transmit feedback in any suitable manner. In embodiments, the feedback transmitter 225 can issue feedback through IoT devices 265. For example, the feedback transmitter 225 can, in embodiments, transmit feedback to the user via speakers 270. In these embodiments, the feedback can be audio based feedback indicating whether the user is closer or farther from the audio input source.

In some embodiments, the feedback transmitter 225 can be configured to transmit feedback through light emitters 275 (e.g., light emitting diodes (LEDs), programmable lighting, etc.). In these embodiments, visual based feedback can be transmitted by the feedback transmitter 225 indicating whether or not the user is closer or farther from the audio input source. For example, a first color (e.g., red) can indicate that the user is closer to the audio input source, while a second color (e.g., blue) can indicate that the user is farther from the audio input source. As another example, the frequency of lights blinking (e.g., flickering, pulsing) can be associated with whether or not the user is closer or farther from the audio input source (e.g., a high frequency blinking can indicate the user is closer while low frequency blinking can indicate the user is farther).

In some embodiments, the feedback transmitter 225 can issue feedback to the user through touch devices 280. For example, haptic feedback can be provided to the user indicating whether or not the user is closer or farther from the audio input source. As an example, a high vibration transmitted through a touch device 280 can indicate the user is closer to the audio input source while a low vibration transmitted through touch device 280 can indicate the user is farther from the audio input source.

In some embodiments, the feedback transmitter 225 can issue feedback to the user through display devices 285. In these embodiments, visual indicators indicating whether or not the user is closer or farther from the audio input source can be displayed on a display. For example, words, symbols, colors, and the like can be associated with the proximity to the audio input source and can be displayed as feedback to the user through display devices 285.

A location indication receiver 227 of the identification session module 220 can be configured to receive an indication that the user has located the audio input source. Any suitable data can be used to indicate whether the user has located the audio input source. In some embodiments, the indication that the user located the device can be determined based on a recognized phrase uttered by the user (e.g., "I found the device"). In these embodiments, in response to one or more keywords recognized by the user through the audio input source, a determination can be made that the user located the device. In some embodiments, the indication that the user located the device can be determined based on the volume of the user's speech. For example, if the volume exceeds a volume threshold, a determination can be made that the user located the device. In some embodiments, the user can manually indicate (e.g., through a graphical user interface (GUI)) that they found their device. For example, the user can indicate they located the device through touch devices and/or through display devices 285. In some embodiments, visual data (e.g., captured by a camera) can be used to determine whether the user has located the audio input source.

Upon receiving the indication that the user located the audio input source, a device manager 230 of the audio input source identification system 205 can be configured to prompt the user to provide an identity (if it has not already been assigned one) of the audio input source. The device manager 230 can then add the audio input source identity to a list of source identifications 245 for known audio input sources 240 such that the user can select the audio input source in the future. In embodiments, the device manager 230 prompts the user to select an audio input device from the list of audio input devices upon initiation of a future voice session.

It is noted that FIG. 2 is intended to depict the representative major components of an example IoT environment 200. In some embodiments, however, individual components can have greater or lesser complexity than as represented in FIG. 2, components other than or in addition to those shown in FIG. 2 can be present, and the number, type, and configuration of such components can vary.

Figure 3:
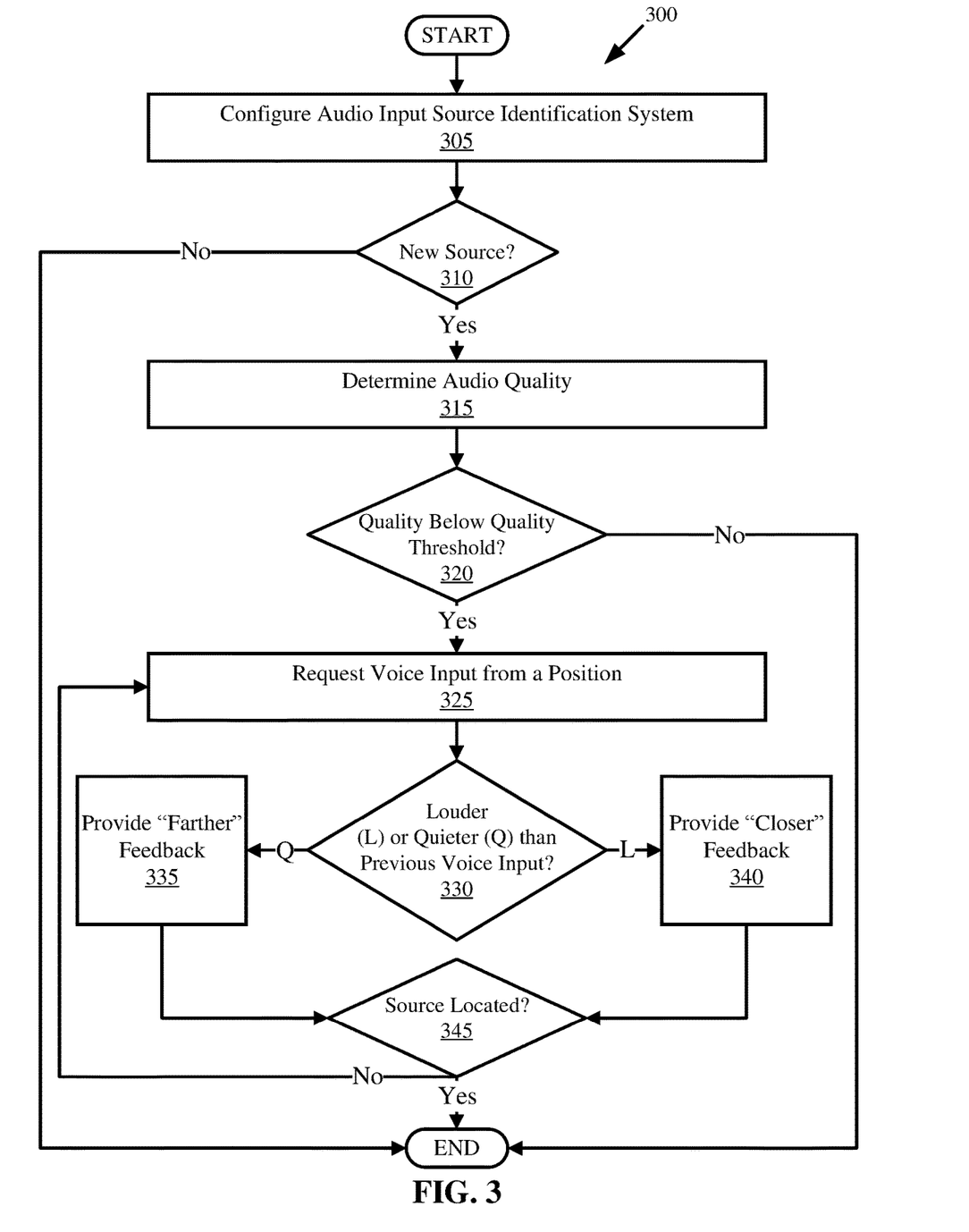
FIG. 3 is a flow-diagram illustrating an example method for audio input source identification, in accordance with embodiments of the present disclosure.

Referring now to FIG. 3, shown is a flow diagram of an example method 300 for audio input source identification, in accordance with embodiments of the present disclosure. One or more operations of method 300 can be completed by one or more processing circuits (e.g., devices 105, server 135, audio input source identification system 205, audio input sources 240, etc.).

Method 300 initiates at operation 305, where an audio input source identification system is configured. Configuring the audio input source identification system can include installing, requesting provisioning from a server, or otherwise configuring a user device configured for voice sessions with audio input source identification software. The user can opt into the audio source identification system such that the system can aid a user in identifying and/or managing audio input sources.

Upon an attempt to communicate through an audio input source in a voice session, a determination is made whether the audio input source is new. This is illustrated at operation 310. Determining whether the audio input source is new can be completed in the same, or a substantially similar, manner as described with respect to the new source identifier 210 of FIG. 1. In some embodiments, determining that the audio input source is new can initiate an identification session (e.g., a feedback loop whereby a user is guided to find the audio input source).

As depicted in FIG. 3, if a determination is made that the audio input source is not new, then method 300 ends. If a determination is made that the audio input source is new, then an audio quality is determined. This is illustrated at operation 315. Determining audio quality of the audio input source can be completed in the same, or a substantially similar, manner as described with respect to the audio quality determiner 215 of FIG. 2. For example, a signal and/or NLP based analysis can be completed to determine audio quality transmitted into the audio input source.

A determination is made whether the audio quality is below an audio quality threshold. This is illustrated at operation 320. If a determination is made that the audio quality is above the audio quality threshold, then method 300 ends. If a determination is made that the audio quality is below the audio quality threshold (e.g., the audio quality is poor), then a voice input is requested from a user from a first position. This is illustrated at operation 325. This initiates an identification session such that a user can be guided to find the audio input source throughout operations 325 to 345. In the instance where the voice input is a first received voice input, then a second voice input is requested from the user from a second position such that a first volume of the first received voice input can be compared to a second volume of the second received voice input.

A determination is made whether the recent voice input received at operation 325 is louder (e.g., a higher volume) or quieter (e.g., a lower volume) than a previously submitted voice input. This illustrated at operation 330. As such, if the second volume of the second voice input from the second location exceeds the first volume of the first voice input from the first location, then a determination is made that the second voice input is louder. In contrast, if the second volume of the second voice input from the second location falls below the first volume of the first voice input from the first location, then a determination is made that the second voice input is quieter.

If a determination is made that the recently received voice input is quieter than the previously received voice input, then "farther" feedback is transmitted to the user. This is illustrated at operation 335. The "farther" feedback can indicate to the user that they have moved farther from the audio input source from the second position. If a determination is made that the recently received voice input is louder than the previously received voice input, then "closer" feedback is transmitted to the user. This is illustrated at operation 340. The "closer" feedback can indicate to the user that they have moved closer to the audio input source at the second position. The feedback submitted at operations 335 and 340 can be the same as, or substantially similar to, the feedback transmitted by the feedback transmitter 225 of FIG. 2. For example, the feedback transmitted at operations 335 and 340 can be audio, visual, and/or haptic feedback.

A determination is made, after operation 335 or operation 340, whether the audio input source is located. This is illustrated at operation 345. Determining whether the audio source has been located can be completed in the same, or a substantially similar manner, as described with respect to the location indication receiver 227 of FIG. 2. If a determination is made that the source has not been located at operation 345, then method 300 returns to operation 325, where another voice input is requested from the user from another position. This voice input (e.g., a third voice input) can be compared to the previously received voice input (e.g., the second voice input) such that the user can be guided to locate the audio input source. If the audio input source is located at operation 345, then method 300 ends.

The aforementioned operations can be completed in any order and are not limited to those described. Additionally, some, all, or none of the aforementioned operations can be completed, while still remaining within the spirit and scope of the present disclosure. For example, in some embodiments, operation 310 may not be completed, as even if the audio input source is known, the user may still desire to identify which audio input source they are communicating through.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
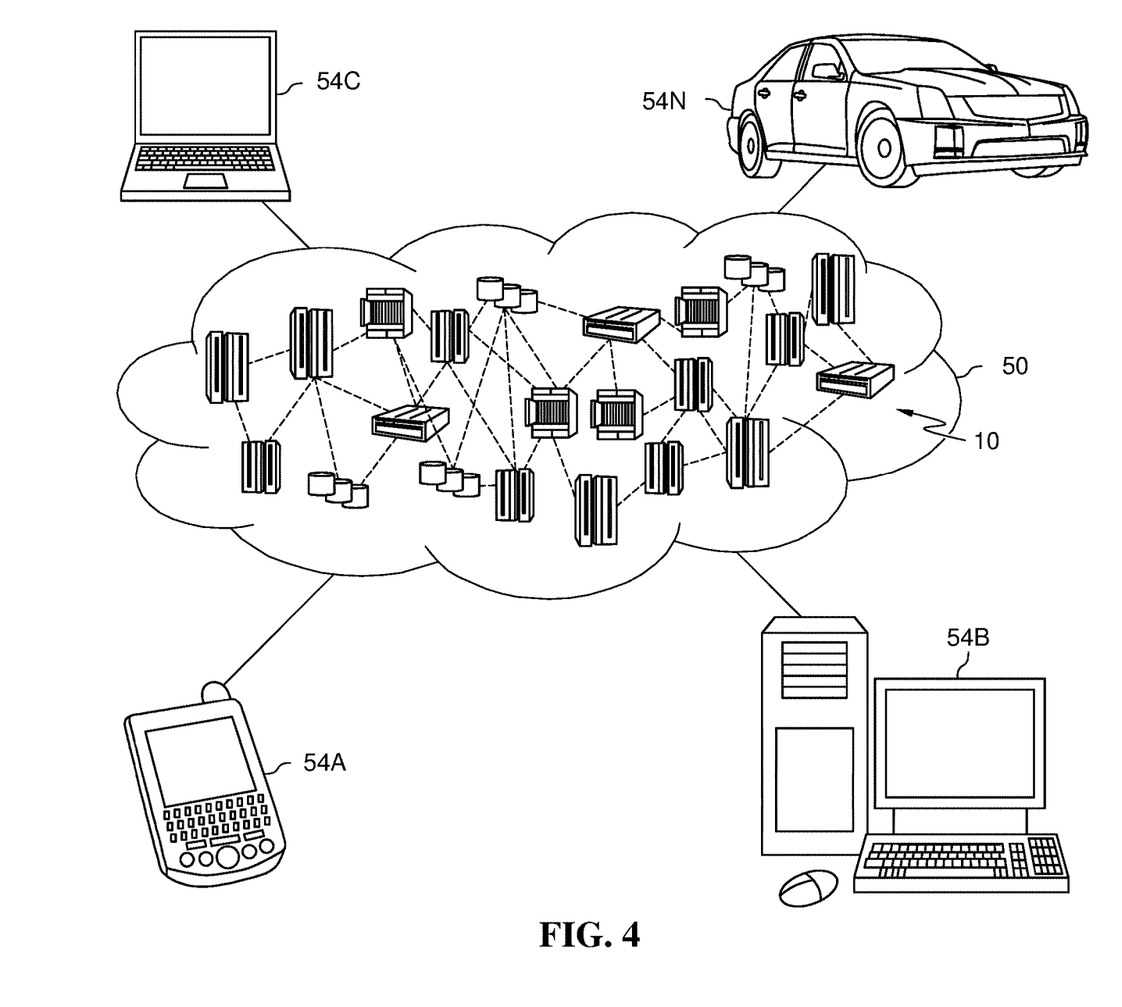
FIG. 4 is a diagram illustrating a cloud computing environment, in accordance with embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
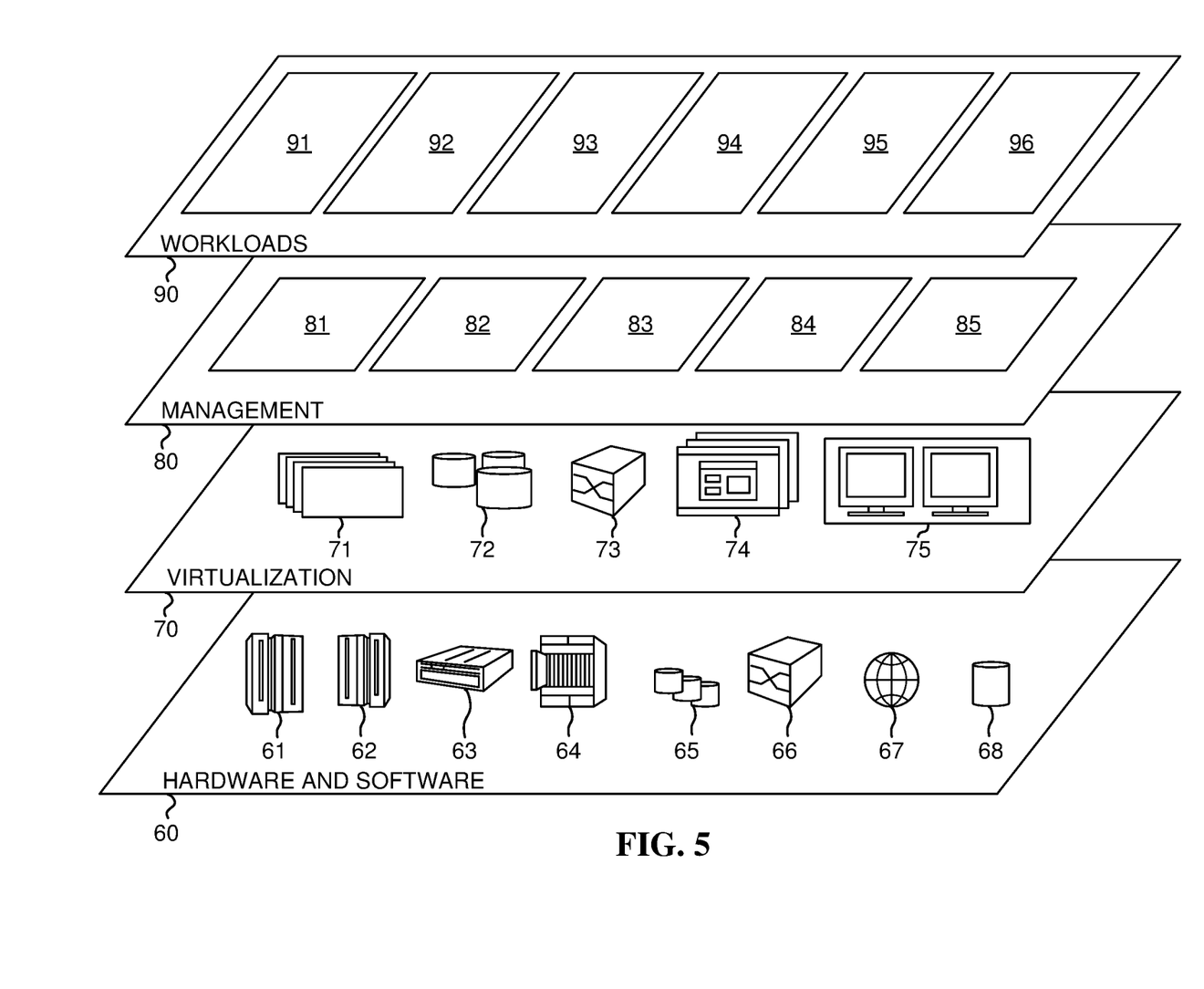
FIG. 5 is a block diagram illustrating abstraction model layers, in accordance with embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and audio input source identification 96.

Figure 6:
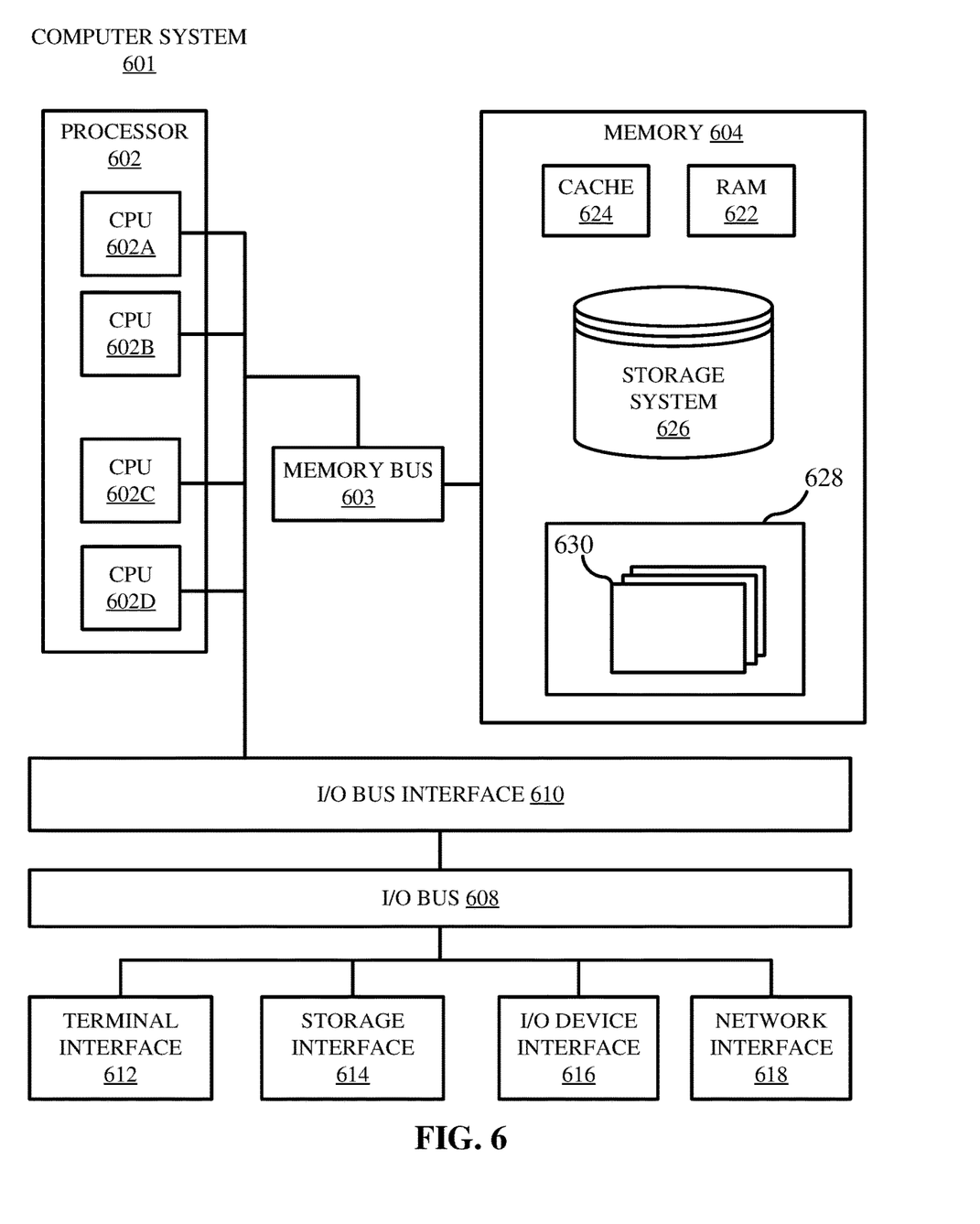
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 601 (e.g., devices 105 and server 135) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   determining, upon an attempt to communicate through an audio input source in a voice session, whether an audio quality received from a user through the audio input source is below an audio quality threshold;
   receiving, in response to determining that the audio quality through the audio input source is below the audio quality threshold, a first voice input from the user from a first position;
   receiving a second voice input from the user from a second position;
   comparing a first volume of the first voice input from the first position to a second volume of the second voice input from the second position; and
   providing feedback to the user indicating whether the second position is closer or farther than the first position from the audio input source based on the comparison.

2. The method of claim 1, wherein prior to determining whether the audio quality through the audio input source is below the audio quality threshold, a determination is made whether the audio input source is a new source.

3. The method of claim 1, further comprising:
   receiving an indication that the user located the audio input source;
   prompting the user to provide an identification of the audio input source; and
   adding the identified audio input source to a list of known audio input sources.

4. The method of claim 3, where the indication is received based on a recognized phrase received through the audio input source.

5. The method of claim 1, wherein the feedback is audio feedback provided to the user through speakers.

6. The method of claim 1, wherein determining whether the audio quality is below the audio quality threshold includes determining whether an amplitude of audio signals received from the user falls below an amplitude threshold.

7. The method of claim 1, wherein determining whether the audio quality is below the audio quality threshold includes determining that a threshold number of words cannot be recognized over a time interval.

8. A system comprising:
one or more processors; and
one or more computer-readable storage media storing program instructions which, when executed by the one or more processors, are configured to cause the one or more processors to perform a method comprising:
determining, upon an attempt to communicate through an audio input source in a voice session, whether an audio quality received from a user through the audio input source is below an audio quality threshold;
receiving, in response to determining that the audio quality through the audio input source is below the audio quality threshold, a first voice input from the user from a first position;
receiving a second voice input from the user from a second position;
comparing a first volume of the first voice input from the first position to a second volume of the second voice input from the second position; and
providing feedback to the user indicating whether the second position is closer or farther than the first position from the audio input source based on the comparison.

9. The system of claim 8, wherein prior to determining whether the audio quality through the audio input source is below the audio quality threshold, a determination is made whether the audio input source is a new source.

10. The system of claim 8, wherein the method performed by the one or more processors further comprises:
receiving an indication that the user located the audio input source;
prompting the user to provide an identification of the audio input source; and
adding the identified audio input source to a list of known audio input sources.

11. The system of claim 10, where the indication is received based on a recognized phrase received through the audio input source.

12. The system of claim 8, wherein the feedback is haptic feedback provided to the user through a touch source.

13. The system of claim 8, wherein determining whether the audio quality is below the audio quality threshold includes determining whether a frequency of audio signals received from the user falls below a frequency threshold.

14. The system of claim 8, wherein determining whether the audio quality is below the audio quality threshold includes determining that a threshold number of words cannot be recognized over a time interval.

15. A computer program product comprising one or more computer readable storage media, and program instructions collectively stored on the one or more computer readable storage media, the program instructions comprising instructions configured to cause one or more processors to perform a method comprising:
determining, upon an attempt to communicate through an audio input source in a voice session, whether an audio quality received from a user through the audio input source is below an audio quality threshold;
receiving, in response to determining that the audio quality through the audio input source is below the audio quality threshold, a first voice input from the user from a first position;
receiving a second voice input from the user from a second position;
comparing a first volume of the first voice input from the first position to a second volume of the second voice input from the second position; and
providing feedback to the user indicating whether the second position is closer or farther than the first position from the audio input source based on the comparison.

16. The computer program product of claim 15, wherein prior to determining whether the audio quality through the audio input source is below the audio quality threshold, a determination is made whether the audio input source is a new source.

17. The computer program product of claim 15, wherein the method performed by the one or more processors further comprises:
receiving an indication that the user located the audio input source;
prompting the user to provide an identification of the audio input source; and
adding the identified audio input source to a list of known audio input sources.

18. The computer program product of claim 17, where the indication is received based on a recognized phrase received through the audio input source.

19. The computer program product of claim 15, wherein the feedback is visual feedback provided through a light emitter, where a first color emitted through the light emitter indicates the user is closer to the audio input source, where a second color emitted through the light emitter indicates the user is farther from the audio input source.

20. The computer program product of claim 15, wherein determining whether the audio quality is below the audio quality threshold includes determining whether a frequency of audio signals received from the user falls below a frequency threshold.

* * * * *